(12) United States Patent
McDonald

(10) Patent No.: US 11,547,083 B2
(45) Date of Patent: Jan. 10, 2023

(54) TILT FORWARD HEAD GATE FOR LIVESTOCK CHUTE

(71) Applicant: Rawhide Portable Corral, Inc., Abilene, KS (US)

(72) Inventor: John L. McDonald, Abilene, KS (US)

(73) Assignee: Rawhide Portable Corral, Inc., Abilene, KS (US)

( * ) Notice: Subject to any disclaimer, the term of this patent is extended or adjusted under 35 U.S.C. 154(b) by 0 days.

(21) Appl. No.: 17/470,091

(22) Filed: Sep. 9, 2021

(65) Prior Publication Data
US 2022/0071170 A1 Mar. 10, 2022

Related U.S. Application Data

(60) Provisional application No. 63/076,074, filed on Sep. 9, 2020.

(51) Int. Cl.
*A01K 1/00* (2006.01)
*A01K 1/06* (2006.01)

(52) U.S. Cl.
CPC .................. *A01K 1/0613* (2013.01)

(58) Field of Classification Search
CPC ................................... A01K 1/0613
USPC .............. 119/729, 731, 733, 734, 736
See application file for complete search history.

(56) References Cited

U.S. PATENT DOCUMENTS

| | | | |
|---|---|---|---|
| 5,065,701 A | 11/1991 | Punt | |
| 5,184,572 A * | 2/1993 | Meier | A01K 15/00 119/733 |
| 6,609,480 B2 | 8/2003 | Daniels et al. | |
| 8,910,595 B2 | 12/2014 | Ulrich | |
| 9,259,009 B2 | 2/2016 | Callicrate | |
| 2005/0132978 A1 | 6/2005 | Bentz | |
| 2012/0192808 A1 * | 8/2012 | Daniels | A01K 1/0613 119/729 |

OTHER PUBLICATIONS

American Cattlemen, "Customer Focus Leads to Improved Cattle Handling Facilities", Aug. 1, 2016, available at: https://www.americancattlemen.com/articles/customer-focus-leads-improved-cattle-handling-facilities.
The Beef Site, "Handling Facilities for Beef Cattle", Apr. 2, 2007, available at: https://www.thebeefsite.com/articles/912/handling-facilities-for-beef-cattle/.
International Search Report and Written Opinion in corresponding PCT/US2021/049583, dated Dec. 10, 2021.

* cited by examiner

*Primary Examiner* — Richard T Price, Jr.
(74) *Attorney, Agent, or Firm* — Hovey Williams LLP

(57) ABSTRACT

Livestock head gate assembly configured to be installed as part of a livestock chute for holding an animal, including a head gate frame and a pair of laterally spaced gate panels laterally shiftable relative to each other between a releasing condition and a holding condition. The gate panels cooperatively define a gate opening, with the gate panels permitting the animal to move through the gate opening in the releasing condition and removably engaging a neck of the animal in the holding condition to restrict animal movement through the gate opening. The head gate frame is configured to be pivotally attached to the chute frame at a pivot joint defining a lateral pivot axis such that the head gate is swingable away from the chute frame toward the holding condition to orient the neck along a longitudinal direction and restrict movement of a head of the animal.

25 Claims, 11 Drawing Sheets

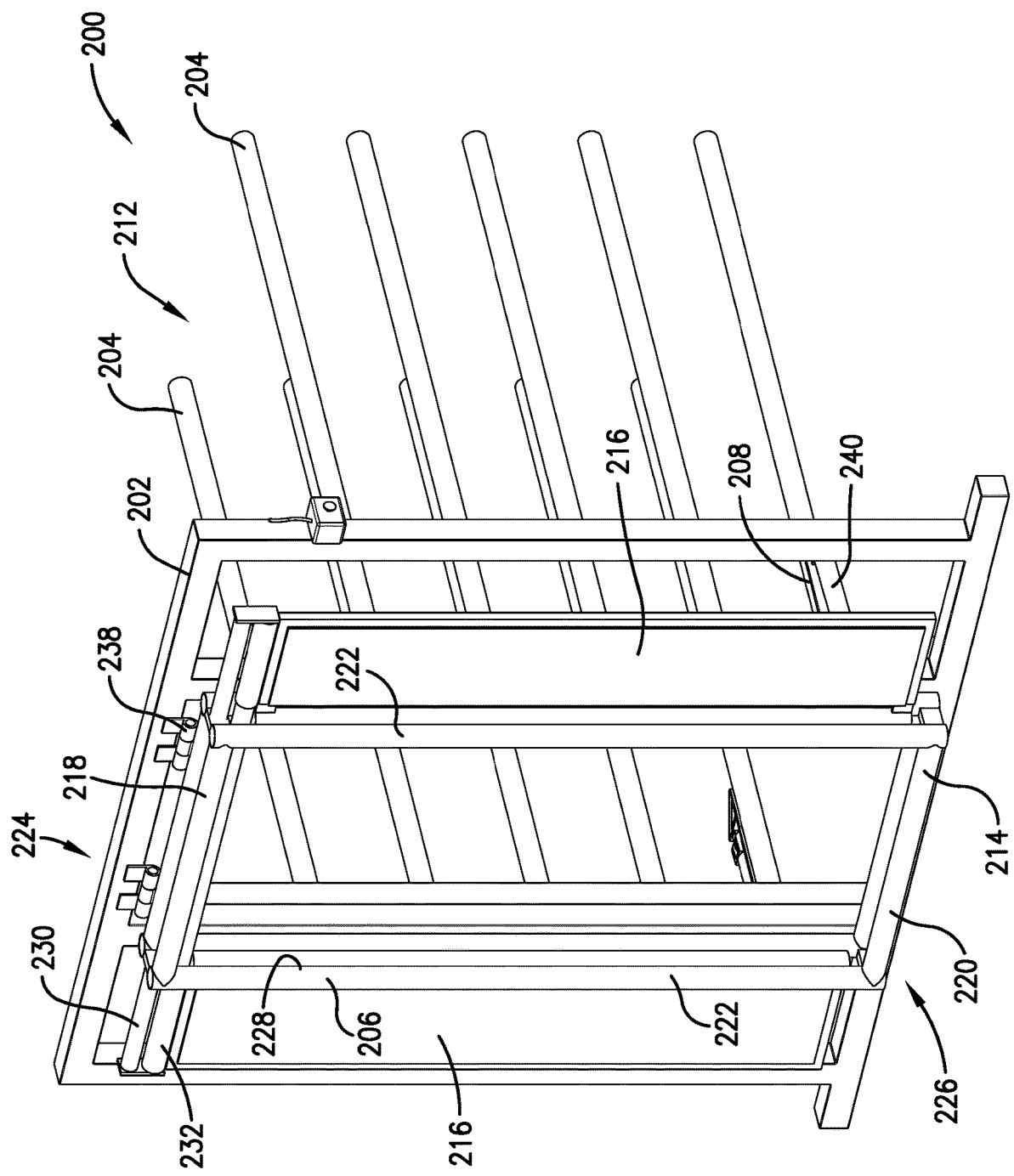

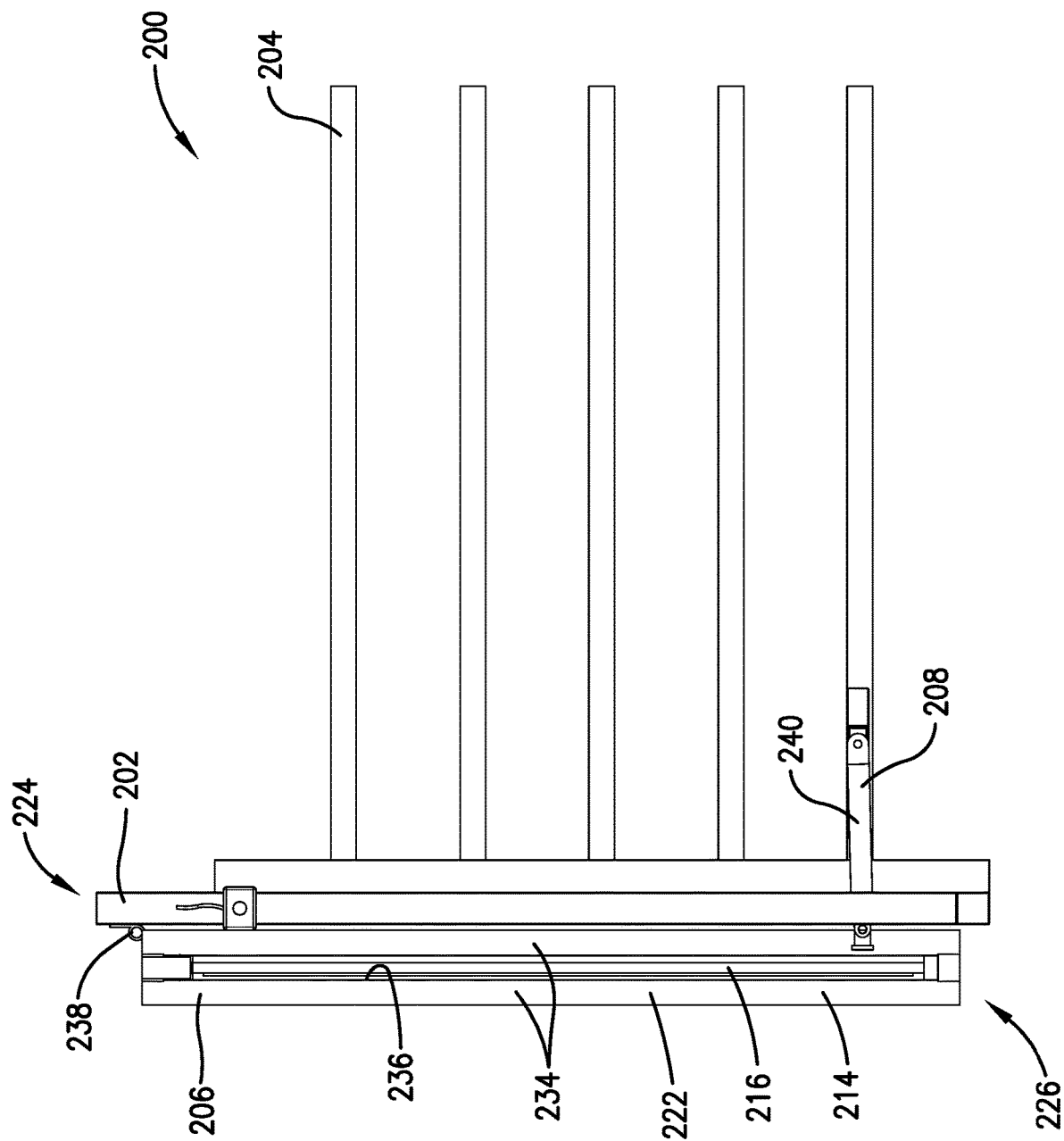

TILT FORWARD HEAD GATE FOR LIVESTOCK CHUTE

CROSS-REFERENCE TO RELATED APPLICATIONS

The present application claims the priority benefit of U.S. Provisional Patent Application Ser. No. 63/076,074, filed Sep. 9, 2020, entitled TILT FORWARD HEAD GATE FOR LIVESTOCK CHUTE, which is hereby incorporated in its entirety by reference herein.

BACKGROUND

Field of the Invention

The disclosure relates generally to equipment for handling livestock. More specifically, embodiments herein concern a shiftable head gate for a livestock chute.

Discussion of Related Art

Livestock chutes have been long used in the cattle industry for capturing and holding a particular animal to provide the animal with individualized care and treatment. Conventional chutes are variously configured to grab or "squeeze" the animal so that the animal is held firmly in place without harming the animal. For example, prior art chutes commonly include side panels that are shiftable to apply pressure on both sides of the animal. It is also well known for chutes to include a head gate that grabs the animal's neck, such that the head gate restricts movement of the animal through the chute. Features of known chutes permit the operator to quickly catch and release the animal. Known chutes also permit convenient observation and treatment of the animal.

However, conventional livestock chutes have various deficiencies. Although prior art cattle chutes are known to firmly squeeze the animal, certain types of animal movement are still permitted by these chutes. For instance, the head gates of conventional chutes permit the animal to abruptly throw its head up, down, and to either side. Such head movement is potentially harmful to the animal and also presents a threat to the operator's safety. While certain prior art chutes include devices mounted on the head gate to limit head movement, these devices are also problematic. For instance, known head-restraining devices are cumbersome and dangerous for the operator to apply to the animal.

SUMMARY

The following brief summary is provided to indicate the nature of the subject matter disclosed herein. While certain aspects of the present invention are described below, the summary is not intended to limit the scope of the present invention.

Embodiments of the present invention provide a shiftable head gate that does not suffer from the problems and limitations of prior art devices, including those set forth above.

A first aspect disclosed herein concerns a livestock chute configured to hold an animal. The livestock chute broadly includes an elongated chute frame and an upright head gate. The chute frame at least partly defines an alleyway that extends longitudinally through the livestock chute, with the chute frame permitting the animal to advance forwardly through the alleyway. The head gate includes a head gate frame and a pair of laterally spaced gate panels. The gate panels are laterally shiftable relative to each other between a releasing condition and a holding condition. The gate panels cooperatively define a gate opening, with the gate panels permitting the animal to move fully or partially through the gate opening in the releasing condition and removably engaging a neck of the animal in the holding condition to restrict animal movement through the gate opening. The head gate frame presents upper and lower frame ends, with the gate panels extending vertically between the upper and lower frame ends. The head gate frame is pivotally attached to the chute frame at a pivot joint adjacent one of the upper and lower frame ends. The pivot joint defines a lateral pivot axis of the head gate, with the head gate being swingable away from the chute frame toward an extended position, such that in the holding condition, the head gate is operable to orient the neck of an animal along a longitudinal direction and/or restrict movement of the head of the animal.

A second aspect disclosed herein concerns a livestock head gate assembly configured to be installed as part of a livestock chute for holding an animal. The chute includes an elongated chute frame at least partly defining an alleyway that extends longitudinally through the livestock chute, with the chute frame permitting the animal to advance forwardly through the alleyway. The livestock head gate broadly includes a head gate frame and a pair of laterally spaced gate panels. The gate panels are laterally shiftable relative to each other between a releasing condition and a holding condition. The gate panels cooperatively define a gate opening, with the gate panels permitting the animal to move fully or partially through the gate opening in the releasing condition and removably engaging a neck of the animal in the holding condition to restrict animal movement through the gate opening. The head gate frame presents upper and lower frame ends, with the gate panels extending vertically between the upper and lower frame ends. The head gate frame is configured to be pivotally attached to the chute frame at a pivot joint adjacent one of the upper and lower frame ends. The pivot joint defines a lateral pivot axis of the head gate, with the head gate being swingable away from the chute frame, such that in an extended condition, the head gate is operable to orient the neck of an animal along a longitudinal direction and/or restrict movement of the head of the animal.

A third aspect of the present invention concerns a head gate mounting kit configured to shiftably interconnect an elongated livestock chute frame and an upright head gate. The chute frame at least partly defines an alleyway that extends longitudinally to receive an animal, with the chute frame permitting the animal to advance forwardly through the alleyway. The head gate includes a head gate frame and a pair of laterally spaced gate panels configured to removably engage the neck of the animal. The head gate mounting kit broadly includes hinged pivot elements and a drive mechanism. The hinged pivot elements cooperatively form a pivot joint, with a first one of the pivot elements configured to be attached to the chute frame and a second one of the pivot elements configured to be attached to the head gate frame. The pivot joint is configured to define a lateral pivot axis of the head gate and permits the head gate to swing between a retracted position and an extended position, in which at least part of the head gate is shifted forwardly relative to the retracted position to orient the neck along a longitudinal direction and restrict movement of a head of the animal. The drive mechanism is configured to be coupled to the head gate frame and the chute frame to swing the head gate relative to the chute frame between the retracted position and the extended position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Exemplary embodiments of the invention are described in detail below with reference to the attached drawing figures, wherein:

FIG. 10 is a front perspective of the livestock chute shown in FIGS. 8 and 9, showing the head gate pivoted into the retracted position and the gate panels in the releasing condition; and FIG. 11 is a side elevation of the livestock chute similar to FIG. 9, but showing the head gate pivoted into the retracted position.

Figure 1:
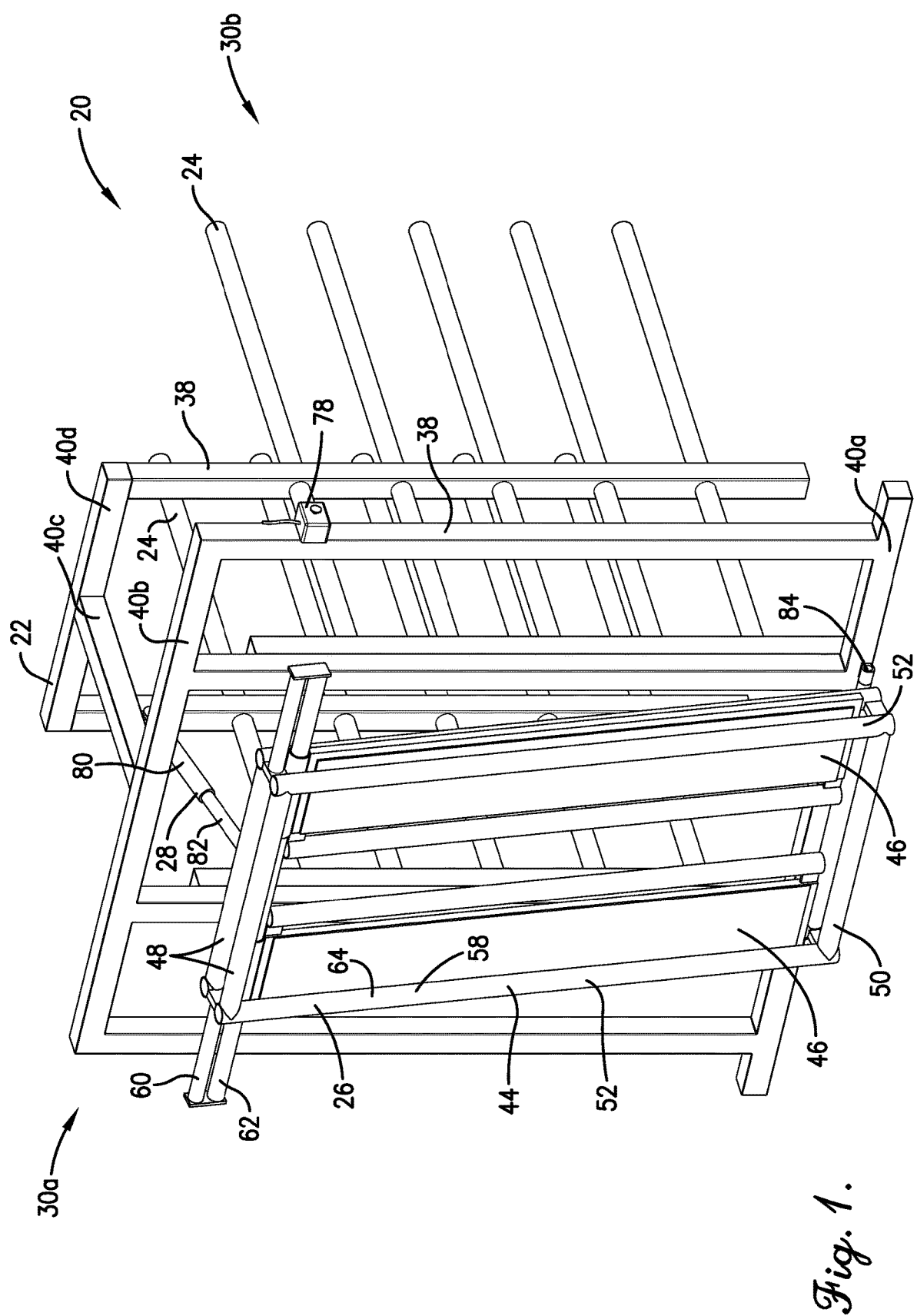
FIG. 1 is a front perspective of a livestock chute constructed in accordance with a first preferred embodiment, showing a chute frame, chute sides, head gate, and tilt drive mechanism, with the head gate in an extended position and gate panels of the head gate in a holding condition.

The drawing figures do not limit the invention to the specific embodiments disclosed and described herein. The drawings are not necessarily to scale, emphasis instead being placed upon clearly illustrating the principles of the exemplary embodiments.

DETAILED DESCRIPTION

Referring to FIGS. 1-7, a livestock chute 20 is configured to be used by an operator to position and hold an animal C for various purposes. For example, as is customarily done, the livestock chute 20 may position and hold the animal C for treatment and/or observation. It will be appreciated that the livestock chute 20 is preferably configured to receive and hold cattle, but alternative chute embodiments may be configured to receive other types of animals, such as horses, hogs, sheep, or goats.

Livestock chute 20 broadly includes a chute frame 22, chute sides 24, an upright head gate 26, and a tilt drive mechanism 28. As will be described, the head gate 26 is configured to orient a neck N of the animal along a longitudinal direction, thereby elongating the neck and further restricting movement of the head H of the animal C. The chute frame 22 and/or chute sides 24 are typically constructed of steel (e.g., tubular steel); however, other suitable materials may be used for these or other structural members of the chute 20, including composites, fiberglass, and the like.

Figure 5:
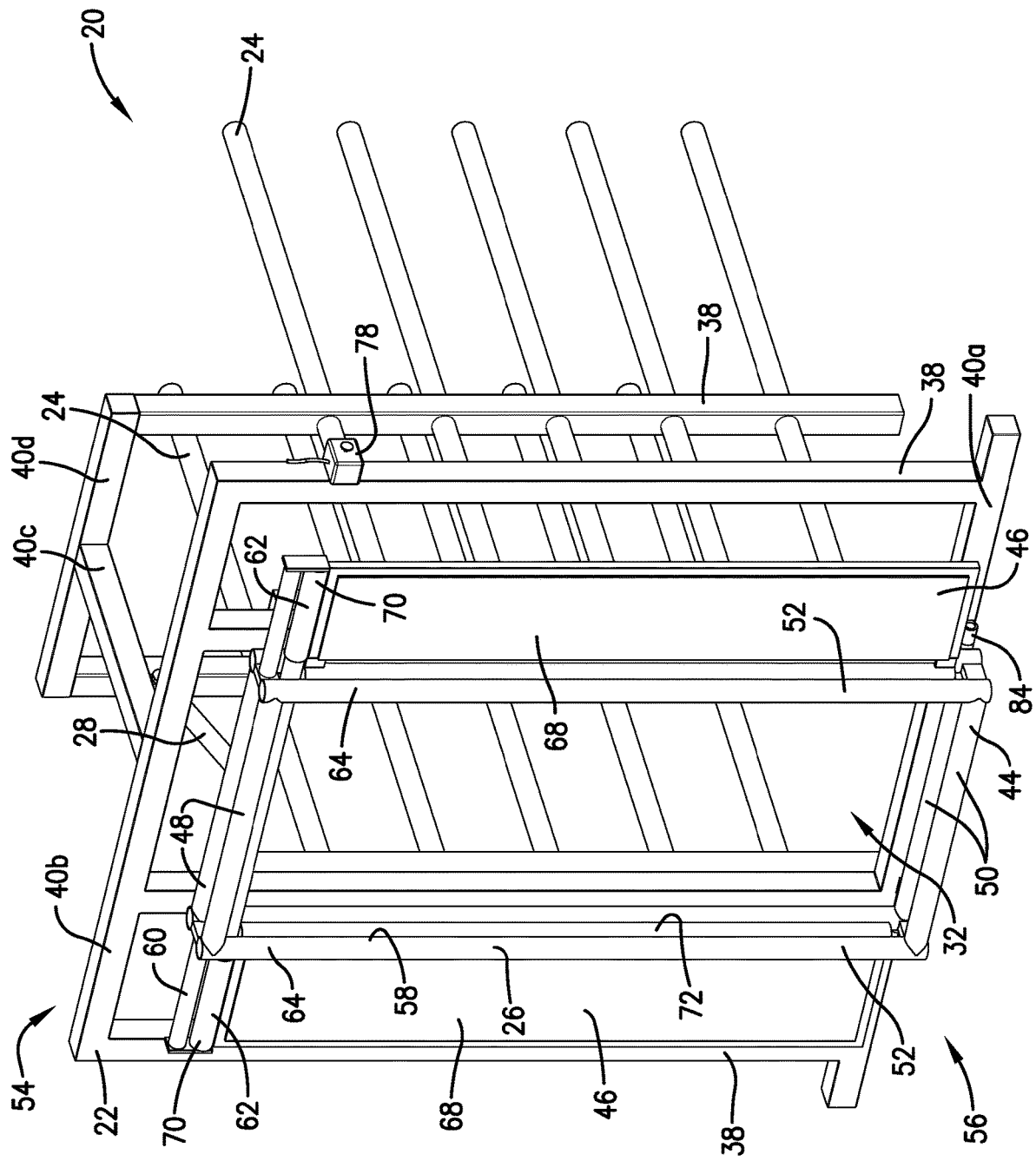
FIG. 5 is a front perspective of the livestock chute similar to FIG. 4, but showing the gate panels shifted into a releasing condition.
Figure 6:
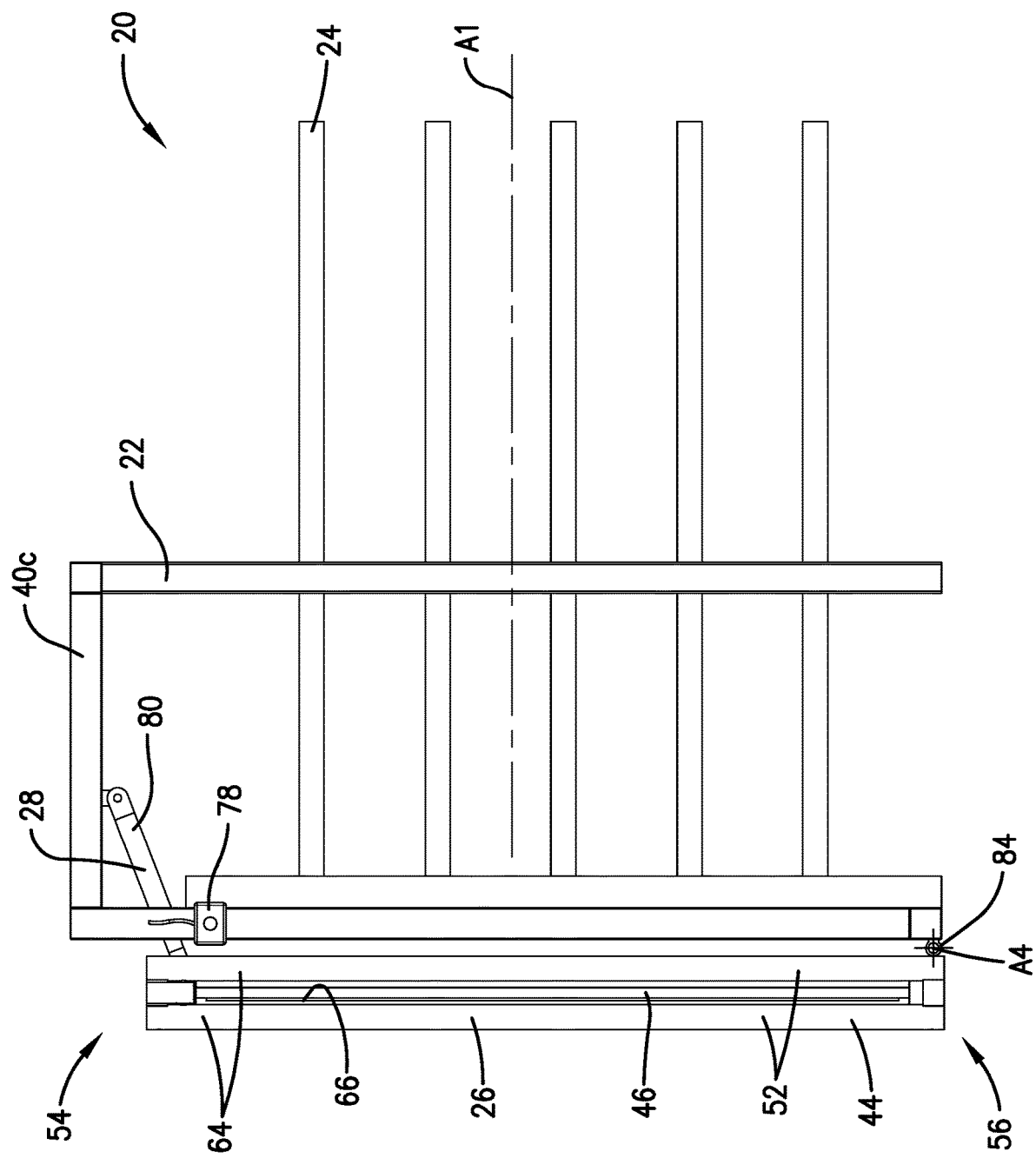
FIG. 6 is a side elevation of the livestock chute similar to FIG. 2, but showing the head gate in the retracted position.

The elongated chute frame 22 and chute sides 24 cooperatively define forward and aft chute ends 30a,b (see FIGS. 1 and 2) and at least partly define an alleyway 32 (see FIGS. 5 and 7) that extends longitudinally therethrough and defines a longitudinal chute axis A1 (see FIG. 6). In the usual manner, livestock chute 20 permits the animal C to advance forwardly through the alleyway 32. Aft chute end 30b defines an ingress opening 34 through which the animal C is permitted to advance into the alleyway 32, while the forward chute end 30a defines an egress opening 36 through which the animal C advances out of the alleyway 32 (see FIG. 4). For at least certain aspects, it will be understood that the animal C may be advanced rearwardly through at least part of the alleyway 32.

Figure 4:
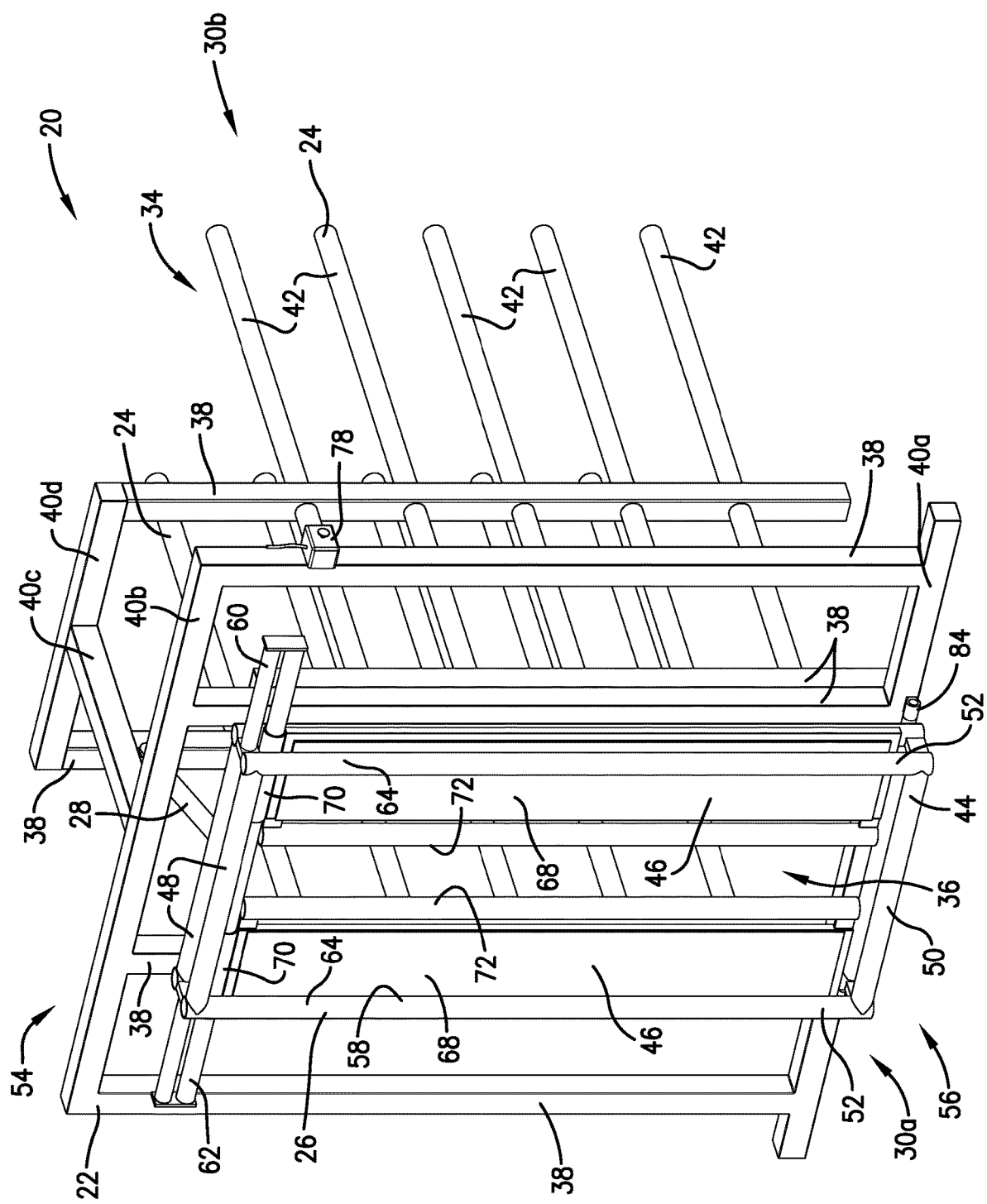
FIG. 4 is a front perspective of the livestock chute similar to FIG. 1, but showing the head gate pivoted into a retracted position.

The depicted chute frame 22 includes a plurality of upright tubular stanchions 38 that are interconnected by and fixed to tubular cross members 40a,40b,40c,40d to form a rigid weldment (see FIG. 4). However, alternative embodiments of the chute frame may be variously configured without departing from the scope of certain aspects of the present invention.

In the usual manner, chute sides 24 are supported by chute frame 22 on opposite sides of the alleyway 32. Each chute side 24 includes a series of laterally-extending rigid tube members 42 (see FIG. 2) that are fixed to the chute frame 22. Although not depicted, it will be understood that the chute sides, adjacent the aft chute end 30b, may be attached to various corrals, pens, panels, fences, the like, so that one or more animals may be conveniently directed into the chute 20. Chute sides 24 are sized and positioned so that a lateral width of the alleyway 32 permits the animal C to move freely through the alleyway 32 (e.g., without necessarily touching both sides).

It will also be appreciated that one or both of the chute sides may be alternatively configured and/or supported within the scope of certain aspects of the present invention. In alternative embodiments, one or both of the chute sides may be shiftably supported for lateral movement relative to the chute frame 22 to provide a so-called "squeeze" chute. For instance, sides of the squeeze chute may be shifted toward one another to simultaneously engage and grip the sides of the animal C. In this manner, the sides cooperatively restrict the animal from moving within the alleyway 32. Alternatively, to facilitate free movement of the animal through the alleyway 32, sides of the squeeze chute may be shifted away from one another so that the sides do not simultaneously engage the animal C. Chute frame may be alternatively configured to shiftably support one or both of the chute sides for lateral movement.

Head gate 26 is operable to releasably engage the animal C for restricting animal egress relative to the alleyway 32. The depicted head gate 26 preferably includes a head gate frame 44 and a pair of laterally spaced gate panels 46 operably supported relative to the head gate frame 44. As will be explained, the gate panels 46 are each shiftably supported by the head gate frame 44 to move between a holding condition and a releasing condition.

Head gate frame 44 comprises a rigid weldment that preferably includes tubular upper and lower frame sections 48,50 and tubular side frame sections 52. The weldment also defines upper and lower frame ends 54,56 and a frame opening 58 extending between the upper and lower frame ends 54,56.

The depicted head gate frame 44 further includes a gate panel track 60 extending along the upper frame end 54 to slidably support the gate panels 46. A tubular rail 62 of the gate panel track 60 extends across the width of the head gate frame 44 to slidably receive each of the gate panels 46.

In one or more embodiments, the head gate may be provided with an alternative track for shiftably supporting the gate panel. For instance, alternative head gate embodiments may have a gate panel track alternatively located relative to the gate panels (e.g., where the gate panel track is vertically located adjacent the lower frame end or at a location vertically between the upper and lower frame ends.

Figure 2:
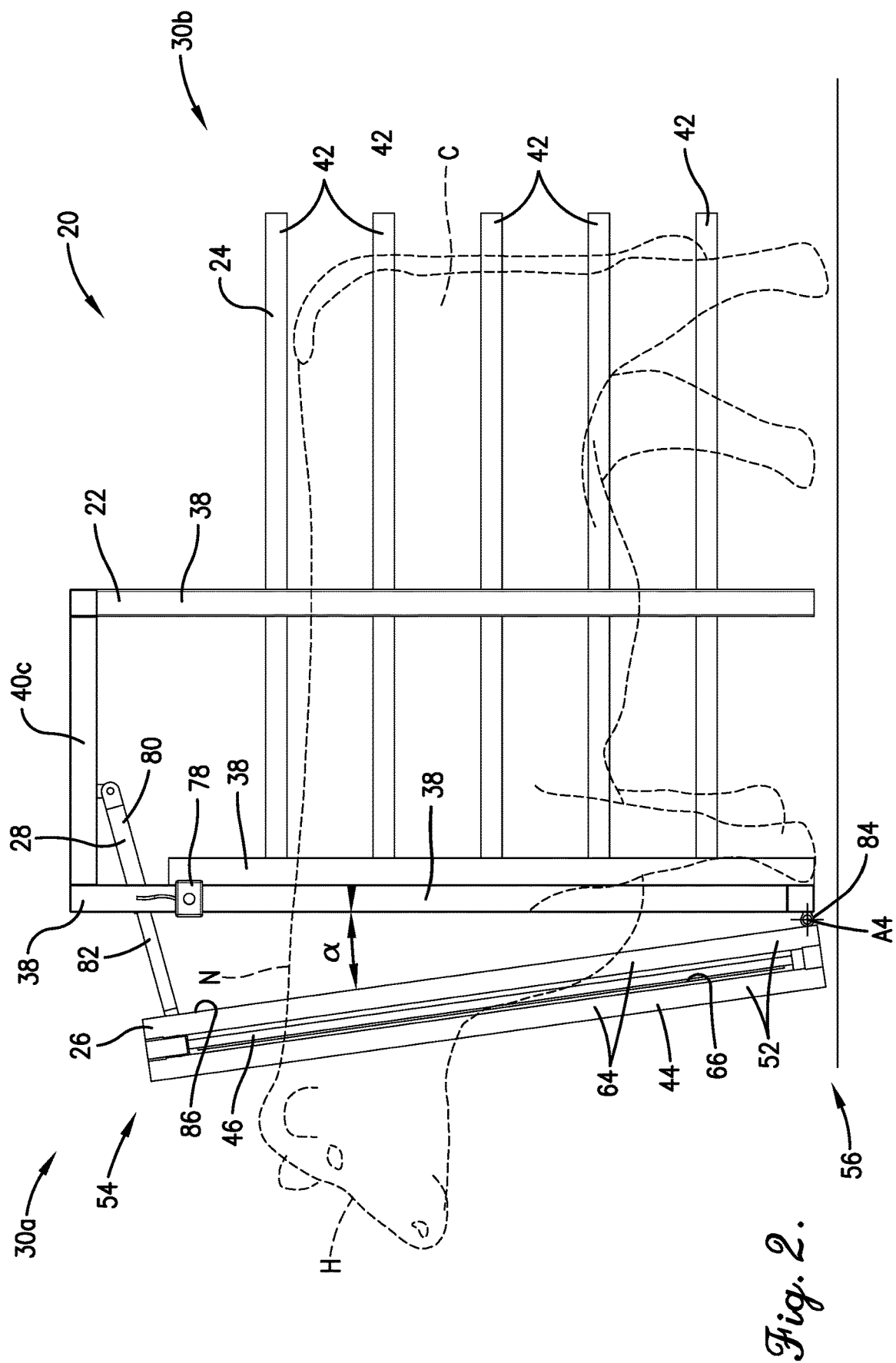
FIG. 2 is a side elevation of the livestock chute shown in FIG. 1, showing an animal positioned in the chute and a hydraulic cylinder of the tilt drive mechanism extended to locate the head gate in the extended position.

Each side frame section 52 includes a pair of uprights 64 that cooperatively define a pocket 66 to slidably receive a respective gate panel 46 (see FIGS. 2 and 6). Thus, the side frame sections 52 cooperate with the gate panel track 60 to restrict gate panel movement along a sliding axis A2 (see FIG. 3).

As discussed below, the illustrated head gate frame 44 is pivotally attached to the chute frame 22 adjacent the lower frame end 56 at a pivot joint. The tilt drive mechanism 28 is configured to tilt the head gate 26 between a retracted position (see FIGS. 4-6) and an extended position (see FIGS. 1-3). As will be explained further, the tilt drive mechanism 28 comprises a hydraulic cylinder and is operably coupled relative to the head gate frame and chute frame.

The gate panels 46 are shiftably mounted on the head gate frame 44 and extend vertically between the upper and lower frame ends 54,56. Each gate panel 46 includes a panel body 68 and a panel support 70 fixed along the top of the panel body 68 (see FIGS. 3-5 and 7). Panel body 68 preferably defines an elongated rectangular shape and presents an inboard panel margin 72 to engage the animal C (see FIGS. 3 and 4). Inboard panel margins 72 have a linear shape and are generally parallel to one another.

In one or more embodiments, one or more gate panels may have an alternative configuration, such as an alternative shape. For instance, alternative inboard panel margins may each include one or more scallop sections that define a concave profile (e.g., to conform to the neck N of the animal C). Although the panel margins have a parallel configuration, alternative gate panels may present inboard panel margins arranged at an oblique angle relative to one another.

The panel support 70 of gate panel 46 is configured to be slidably mounted onto the tubular rail 62 of gate frame 44. Each gate panel 46 also defines a panel axis A3 (see FIG. 3). Preferably, the panel axis A3 is substantially parallel to the sliding axis A2. However, in one or more embodiments, the panel axis A3 and sliding axis A2 may be arranged obliquely relative to one another.

Gate panels 46 of the depicted embodiment are shiftable relative to each other between a releasing condition and a holding condition. In the illustrated releasing condition, each gate panel 46 is preferably located in an outboard position and is retracted from the frame opening 58 (see FIGS. 5 and 7). In the illustrated holding condition, each gate panel 46 is preferably located in an inboard position and extends at least partly across the frame opening 58 (see FIGS. 1, 3, and 4).

Figure 3:
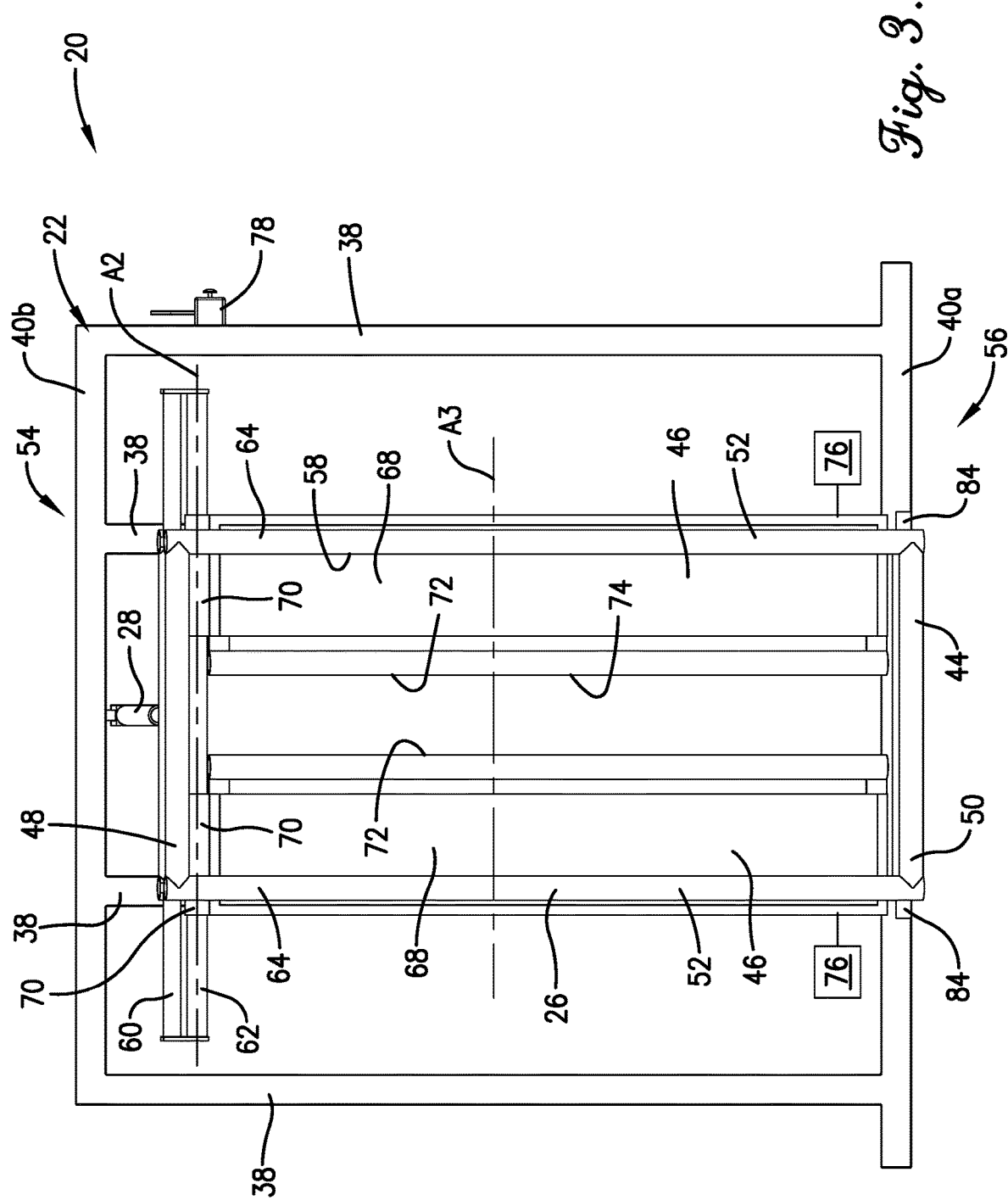
FIG. 3 is a front elevation of the livestock chute shown in FIGS. 1 and 2.
Figure 7:
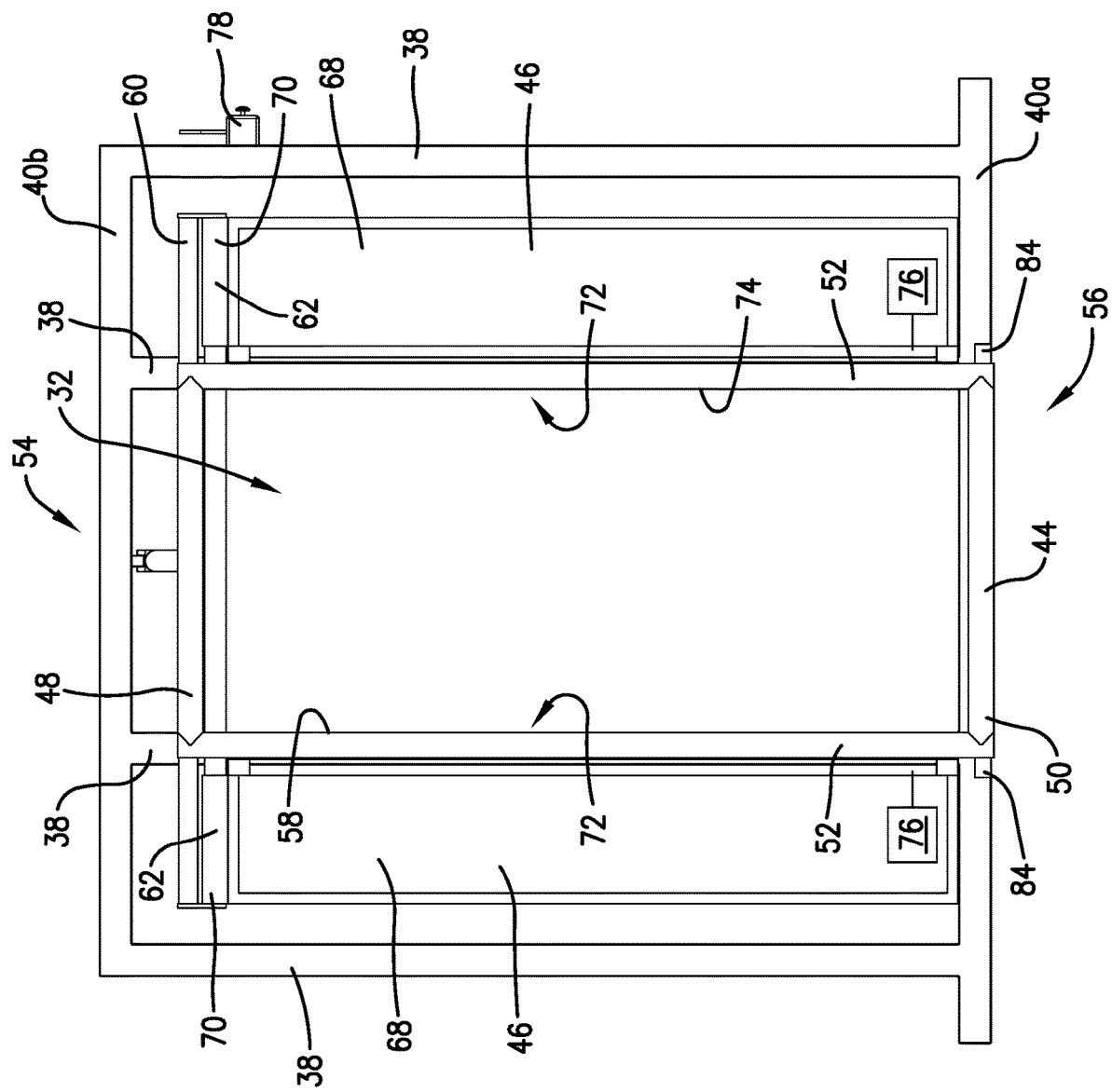
FIG. 7 is a front elevation of the livestock chute similar to FIG. 3, but showing the gate panels in the releasing condition.
Figure 8:
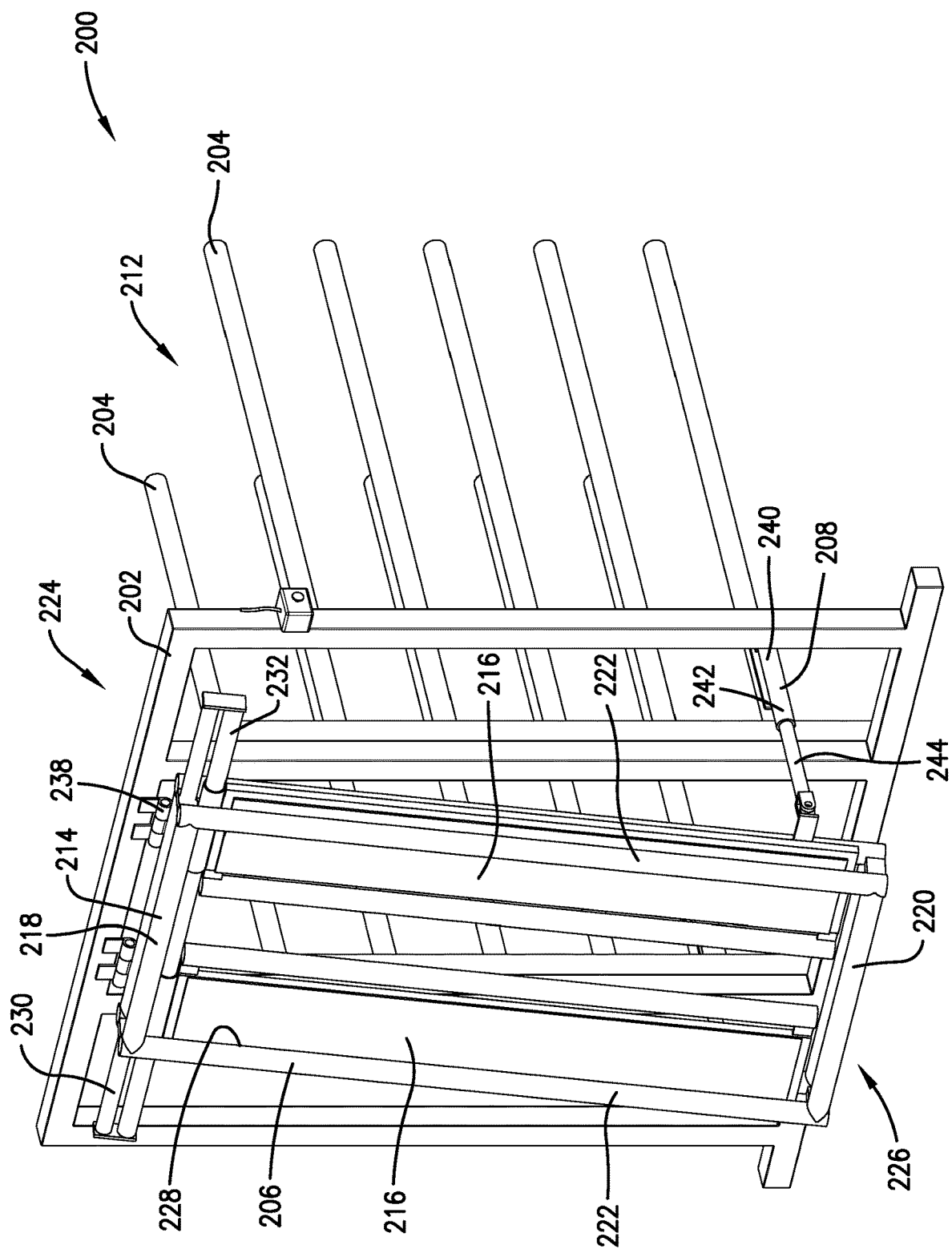
FIG. 8 is a front perspective of a livestock chute constructed in accordance with a second preferred embodiment, showing a chute frame, chute sides, head gate, and tilt drive mechanism, with the head gate in an extended position and gate panels of the head gate in a holding condition.
Figure 9:
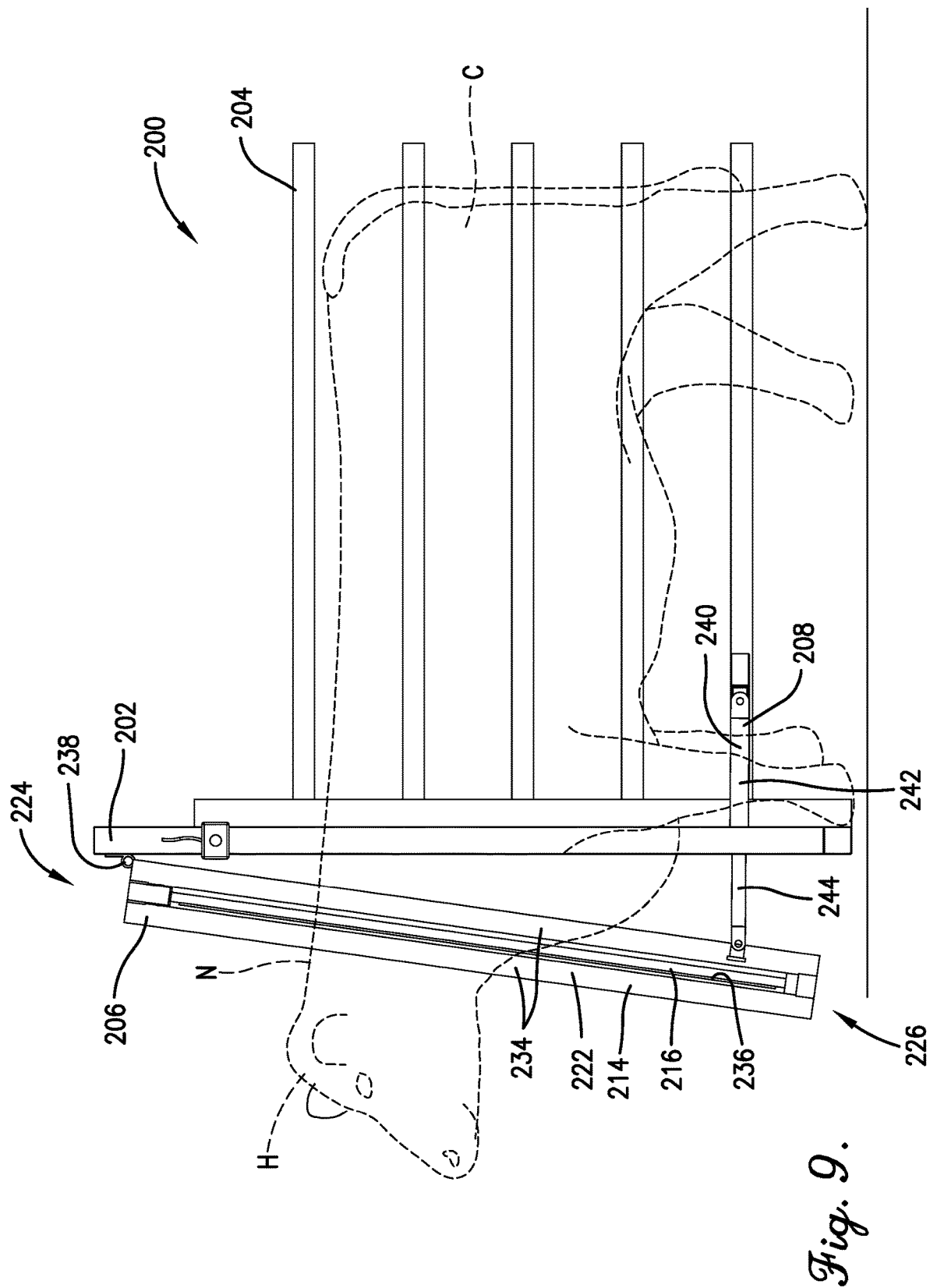
FIG. 9 is a side elevation of the livestock chute shown in FIG. 8, showing an animal positioned in the chute and a hydraulic cylinder of the tilt drive mechanism extended to locate the head gate in the extended position.

Inboard panel margins 72 of the gate panels cooperatively define a gate opening 74 (see FIGS. 3 and 7). The gate panels 46 permit the animal C to move through the gate opening 74 in the releasing condition and removably engage the neck N in the holding condition to restrict animal movement through the gate opening 74.

Preferably, each gate panel 46 is shiftably supported by the head gate frame 44 to slide laterally along the panel sliding axis A2 between the inboard and outboard positions. The panel sliding axis A2 is preferably substantially orthogonal to the longitudinal axis A1 of the alleyway 32. It is also within the scope of certain aspects, for the panel sliding axis A2 to be arranged at an oblique angle relative to the longitudinal alleyway axis A1.

In the illustrated embodiment, each gate panel 46 is preferably shiftable between the inboard position (see FIG. 4) and the outboard position (see FIGS. 5 and 7) when the head gate 26 is located in the retracted position. In preferred embodiments, gate panels 46 may be shifted simultaneously between inboard and outboard positions. In this manner, gate panels 46 may be shifted simultaneously between the releasing condition and the holding condition.

However, for at least certain aspects, one of the gate panels 46 may be shifted independently of the other gate panel 46 between the inboard and outboard positions. Furthermore, gate panels 46 are also shiftable, simultaneously and/or independently, between inboard and outboard positions when the head gate 26 is positioned in locations other than the retracted position, such as the extended position or a location between the retracted and extended positions.

Although the gate panels 46 are each slidable between inboard and outboard positions along the sliding axis A2, alternative head gate embodiments may include a gate panel that is alternatively shiftably supported relative to the head gate frame without departing from the scope of certain aspects of the present invention. For instance, an alternative gate panel may be pivotally supported for pivotal panel movement about a vertical pivot axis between inboard and outboard positions (such as a self-catching head gate with opposed panels that pivot about respective vertical pivot axes toward and away from each other). In other alternative embodiments, a gate panel may be pivotally supported for pivotal panel movement about a horizontal pivot axis between inboard and outboard positions (such as a so-called "scissors-stanchion" head gate with opposite panels that pivot about respective horizontal pivot axes toward and away from each other).

Each gate panel 46 is preferably driven relative to the head gate frame 44 by a panel drive mechanism 76 (depicted schematically in FIGS. 3 and 7) of the head gate 26. More preferably, the panel drive mechanism 76 comprises a panel drive motor associated with respective gate panels. In the illustrated embodiment, the panel drive motor comprises a hydraulic cylinder and is operably coupled between the head gate frame 44 and the corresponding gate panel 46.

The hydraulic cylinder is fluidly coupled to a hydraulic pump (not shown) and hydraulic sump (not shown) via hydraulic lines. In the usual manner, hydraulic cylinder includes a cylinder body and a piston slidably received by the cylinder body.

Although the use of a hydraulic cylinder is preferred, it is within the ambit of at least certain aspects of the invention for the panel drive mechanism to use an alternative powered motor, such as an electric motor or a pneumatic motor. Whether the motor is electrically powered, hydraulically powered, or pneumatically powered, it will be appreciated that alternative motor embodiments may comprise a linear or rotational motor.

Alternative embodiments of the panel drive mechanism may include one more transmission elements to transmit driving power from the powered motor to the gate panel. For example, alternative panel drive mechanisms using a rotational powered motor may include a transmission to convert rotational motion to linear motion.

Although the use of a powered drive mechanism is preferred for shifting the gate panels, one or both of the gate panels may be manually shifted between inboard and outboard positions without departing from the scope of certain aspects of the invention.

Again, the tilt drive mechanism 28 is configured to shift the head gate 26 between the retracted position (see FIGS. 4-6) and the extended position (see FIGS. 1-3). In the illustrated embodiment, the tilt drive mechanism 28 comprises a hydraulic cylinder and is operably coupled relative to the head gate frame and chute frame.

The hydraulic cylinder is fluidly coupled to a hydraulic pump (not shown) and hydraulic sump (not shown) via hydraulic lines. The drive mechanism 28 preferably also includes a switch 78 operably coupled to the pump to selectively drive the hydraulic cylinder. It will be appreciated that the switch 78 is operable to selectively extend the cylinder and to selectively retract the cylinder.

In the usual manner, hydraulic cylinder includes a cylinder body 80 and a piston 82 slidably received by the cylinder body 80 (see FIGS. 1 and 2). Cylinder body 80 is pivotally attached to the cross member 40c of the chute frame 22 (see FIG. 2), while piston 82 is pivotally attached relative the upper frame section 48 of the head gate frame 44.

Although use of a hydraulic cylinder is preferred, it is within the ambit of one or more embodiments for the tilt drive mechanism to use an alternative powered motor, such as an electric motor or a pneumatic motor. Whether the motor is electrically powered, hydraulically powered, or pneumatically powered, it will be appreciated that alternative motor embodiments may comprise a linear or rotational motor.

Alternative embodiments of the tilt drive mechanism may also include one more transmission elements to transmit driving power from the powered motor to the head gate frame. For example, alternative drive mechanisms, particularly having a rotating motor, may include various transmission elements (such as a chain-and-sprocket drive, a gear drive, a belt-and-pulley drive, etc.) driven by a motor output shaft to shift the head gate between the retracted and extended positions.

In the depicted embodiment, the head gate 26 is pivotally attached relative to the forward end 30a of the chute 20. In particular, the illustrated head gate frame 44 is pivotally attached to the chute frame 22 adjacent the lower frame end 56 via a pivot joint 84. The pivot joint 84 comprises pairs of hinged pivot elements located on opposite sides of the head gate frame 44 (see FIG. 3). Each pair of hinged pivot elements includes one pivot element attached to the chute frame 22 and another pivot element attached to the head gate frame 44. The pivot joint 84 defines a lateral pivot axis A4 of the head gate 26 (see FIG. 3).

Although the head gate frame 44 is pivotally attached to the chute frame 22 adjacent the lower frame end 56, the head gate frame and chute frame may be alternatively shiftably attached relative to one another. For instance, as will be shown in a subsequent embodiment, the chute frame and head gate frame may be pivotally attached to one another adjacent an upper frame end of the head gate frame. For at least certain aspects of the present invention, the head gate frame may be slidably attached relative to the chute frame to slide along the longitudinal axis of the chute (e.g., with or without pivoting relative to the chute frame).

In the retracted position, the depicted uprights 64 of the head gate frame 44 are located adjacent to a respective pair of forwardmost stanchions 38 and are generally parallel thereto (see FIG. 6). In the extended position, the head gate 26 is tilted relative to the chute frame 22 so that the uprights 64 and the adjacent stanchions 38 cooperatively define an oblique extension angle α (see FIG. 2). The extension angle α preferably ranges from about five degrees (5°) to about fifteen degrees (15°) and, more preferably, ranges from about five degrees (5°) to about ten degrees (10°). However, it is within the scope of one or more embodiments for the head gate 26 to be alternatively angularly positioned relative to the chute frame in the retracted position and/or the extended position.

As noted above, the tilt drive mechanism 28 is configured to tilt the head gate 26 between the retracted position (see FIGS. 4-6), in which the upper frame end 54 is located adjacent the egress opening 36, and the extended position (see FIGS. 1-3), in which at least part of the head gate 26 is shifted forwardly relative to the retracted position. Although use of the tilt drive mechanism is preferred, embodiments of the chute may include an alternative powered device for moving the head gate 26 between retracted and extended positions.

In one or more embodiments, the drive mechanism may be configured for manual operation to retract and extend the head gate. For instance, an alternative drive mechanism may include a lever (not shown) operably connected to the head gate by one or more transmission elements (such as a linkage, gear, rack, sprocket, chain, pulley, cable, rope, line, dog, pawl, or combinations thereof) to retract and extend the head gate. In alternative embodiments, the lever may be slidably or pivotally mounted adjacent the head gate and operable to be shifted by an operator to cause corresponding retraction and extension of the head gate. It will be understood that a manual drive device may be provided alternatively or additionally to a powered drive.

In use, the depicted head gate 26 is swingable away from the chute frame 22 toward the extended position to orient the neck N (see FIG. 2) along a longitudinal direction and restrict movement of a head H of the animal C (such as lateral head movement and/or vertical head movement). In at least some circumstances, when the neck N is oriented by the extended head gate 26, it will be understood that the neck N may be under some tension, such that the neck N is considered to be "taut." Similarly, in at least some circumstances, positioning of the head gate 26 in the extended position may longitudinally stretch or elongate the neck N, although such stretching or elongation is not required.

Preferably, the longitudinal direction is generally parallel to the longitudinal chute axis A1. However, in one or more embodiments, the longitudinal direction associated with orientation of the neck N may extend obliquely relative to the chute axis A1 along a vertical direction and/or along a lateral direction.

It will be appreciated that the extended head gate 26 is capable of orienting the neck N and, in at least some instances, facilitating extension and stretching of the neck N, because the chute 20 restricts the rest of the animal C from advancing forwardly when the head gate 26 is extended. For instance, when the animal's front legs are located immediately behind the cross member 40a of the chute frame 22, the chute frame 22 (particularly the cross member 40a) and head gate 26 cooperatively restrict the animal C from stepping forwardly when the head gate 26 is extended.

When the head gate 26 is extended, the head gate 26 and the chute frame 22 cooperatively define a fore-and-aft extending access opening 86 (see FIG. 2) that preferably provides the operator with access to the animal's neck N (e.g., for a treatment procedure, such as a medicament injection administered to the neck N).

Once the treatment and/or observation procedure has been completed for the animal C, the head gate 26 may be swung from the extended position toward the retracted position to permit at least some neck and/or head movement of the animal C. Furthermore, animal egress from the chute 20 may be permitted by shifting the gate panels 46 from the holding condition to the releasing condition. It will be understood that opening of the gate panels 46 may occur while the head gate remains in the extended position or after the head gate is returned to the retracted position. With the gate panels 46 opened and the head gate 26 retracted, another animal may be advanced into chute for a treatment and/or observation procedure.

While the pivot joint 84 is preferably located adjacent the lower frame end 56, it is within the ambit of one or more embodiments for the pivot joint to be alternatively located relative to the head gate frame and/or the chute frame. For example, as will be described in a subsequent embodiment, an alternative pivot joint may be located adjacent an upper end of the head gate frame.

In operation, the chute 20 is preferably configured to receive the animal C with the head gate 26 in the retracted position and the gate panels 46 in the releasing condition (see FIGS. 5-7). As the animal C advances forwardly through the alleyway 32, the chute 20 may be configured to engage the animal in a holding process. In particular, the gate panels 46 are quickly shifted from the releasing condition to the holding condition when the animal's neck N extends through the gate opening 74. In the holding condition, the panel margins 72 cooperatively engage and grab the animal's neck N to restrict the animal C from moving forwardly or rearwardly through the alleyway 32.

With the head gate 26 engaging the neck N, the head gate 26 may be pivoted from the retracted position to the extended position to orient the neck N (see FIG. 2) and, in at least some instances, stretch the neck N lengthwise to further restrict lateral movement of the head H.

If the chute sides are shiftable to provide a squeeze chute, the holding process may also include closing the chute sides to apply pressure on opposite sides of the animal to restrict animal movement within the alleyway 32.

Once the treatment and/or observation procedure has been completed, the chute 20 is configured to release the animal and permit animal egress. The releasing process preferably includes shifting the gate panels 46 from the holding condition to the releasing condition. Additionally, the releasing process may include returning the head gate 26 from the extended position to the retracted position. However, the gate panels 46 may be opened while the head gate 26 is in the extended position or after the head gate 26 is retracted.

If the chute sides are shiftable to provide a squeeze chute, the process of releasing the animal may also include opening the chute sides to release pressure from the animal if the chute sides were closed during the treatment and/or observation procedure. The chute 20 is preferably configured to receive another animal when the gate panels 46 are opened and the head gate 26 retracted.

Turning to FIGS. 8-11, an alternative livestock chute 200 is constructed in accordance with another embodiment of the present invention. For the purpose of brevity, the remaining description will focus primarily on the differences of this alternative embodiment from the preferred embodiment described above—the other features remaining the same or substantially similar to the corresponding features described above and incorporated by reference herein with respect to FIGS. 8-11.

The chute 200 preferably includes a chute frame 202, chute sides 204, an upright head gate 206, and a tilt drive mechanism 208. Head gate 206 is operable to releasably engage the animal C for restricting animal egress relative to an alleyway 212. The depicted head gate 206 preferably includes a head gate frame 214 and a pair of laterally spaced gate panels 216 operably supported relative to the head gate frame 214.

Head gate frame 214 comprises a rigid weldment that preferably includes tubular upper and lower frame sections 218,220 and tubular side frame sections 222. The weldment also defines upper and lower frame ends 224,226 and a frame opening 228 extending between the upper and lower frame ends 224,226.

The depicted head gate frame 214 further includes a gate panel track 230 extending along the upper frame end 224 to slidably support the gate panels 216. A tubular rail 232 of the gate panel track 230 extends across the width of the head gate frame 214 to slidably receive each of the gate panels 216. Each side frame section 222 includes a pair of uprights 234 that cooperatively define a pocket 236 to slidably receive a respective gate panel 216.

The illustrated head gate frame 214 is pivotally attached to the chute frame 202 adjacent the upper frame end 224 at a pivot joint 238. The tilt drive mechanism 208 is configured to tilt the head gate 206 between a retracted position and an extended position.

In the illustrated embodiment, the tilt drive mechanism 208 comprises a pair of hydraulic cylinders 240 and is operably coupled relative to the head gate frame and chute frame. Each hydraulic cylinder 240 includes a cylinder body 242 and a piston 244 slidably received by the cylinder body 242. Each cylinder body 242 is pivotally attached to a respective one of the sides 204. Piston 244 is pivotally attached to the head gate frame 214 adjacent the lower frame end 226.

The tilt drive mechanism 208 is configured to tilt the head gate 206 between the retracted position, in which the lower frame end 226 is located adjacent an egress opening, and the extended position, in which at least part of the head gate 206 is shifted forwardly relative to the retracted position.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein. As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description. The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. The inventor hereby states his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A livestock chute configured to hold an animal, said livestock chute comprising:
    an elongated chute frame at least partly defining an alleyway that extends longitudinally through the livestock chute, with the chute frame permitting the animal to advance forwardly through the alleyway; and
    an upright head gate including a head gate frame and a pair of laterally spaced gate panels,
    said gate panels being laterally shiftable relative to each other between a releasing condition and a holding condition,
    said gate panels cooperatively defining a gate opening, with the gate panels permitting the animal to move through the gate opening in the releasing condition and removably engaging a neck of the animal in the holding condition to restrict animal movement through the gate opening,
    said head gate frame presenting upper and lower frame ends, with the gate panels extending vertically between the upper and lower frame ends,
    said head gate frame being pivotally attached to the chute frame at a pivot joint adjacent one of the upper and lower frame ends,
    said pivot joint defining a lateral pivot axis of the head gate, with the head gate being swingable away from the chute frame toward an extended position to orient the neck along a longitudinal direction and restrict movement of a head of the animal.

2. The livestock chute as claimed in claim 1,
    each of said gate panels being shiftably supported by the head gate frame to move between an inboard position associated with the holding condition and an outboard position associated with the releasing condition.

3. The livestock chute as claimed in claim 2,
    each of said gate panels being slidably mounted on the head gate frame to slide along a panel slide axis between the inboard and outboard positions, with the panel slide axes being parallel to one another.

4. The livestock chute as claimed in claim 1,
    said pivot joint being located adjacent the lower frame end of the head gate frame.

5. The livestock chute as claimed in claim 1,
    said chute frame including a forward end that defines an egress opening through which the animal advances out of the alleyway,
    said head gate being attached relative to the forward end and shiftable between a retracted position, in which the head gate is located adjacent the discharge end, and the extended position, in which at least part of the head gate is shifted forwardly relative to the retracted position.

6. The livestock chute as claimed in claim 5,
    each of said gate panels being shiftably supported by the head gate frame to move between inboard and outboard positions associated, respectively, with the open and holding conditions,
    said gate panels being shiftable between the inboard and outboard positions while the head gate is located in either one of the retracted position and the extended position.

7. The livestock chute as claimed in claim 5,
    said pivot joint being located adjacent the lower frame end of the head gate frame, with the upper frame end being located adjacent the discharge end in the retracted position and shifted forwardly relative to the retracted position when the head gate is in the extended position.

8. The livestock chute as claimed in claim 5,
    said pivot joint being located adjacent the upper frame end of the head gate frame, with the lower frame end being located adjacent the discharge end in the retracted position and shifted forwardly relative to the retracted position when the head gate is in the extended position.

9. The livestock chute as claimed in claim 5, further comprising:
    a drive mechanism operably coupled to the head gate frame and chute frame to shift the head gate relative to the chute frame between the retracted position and the extended position.

10. The livestock chute as claimed in claim 9,
    said drive mechanism including a powered motor attached between the head gate frame and chute frame.

11. The livestock chute as claimed in claim 10,
    said pivot joint being located adjacent the lower frame end of the head gate frame.

12. A livestock head gate assembly configured to be installed as part of a livestock chute for holding an animal, said chute including an elongated chute frame at least partly defining an alleyway that extends longitudinally through the livestock chute, with the chute frame permitting the animal to advance forwardly through the alleyway, livestock head gate comprising:
    a head gate frame and a pair of laterally spaced gate panels, said gate panels being laterally shiftable relative to each other between a releasing condition and a holding condition, said gate panels cooperatively defining a gate opening, with the gate panels permitting the animal to move through the gate opening in the releasing condition and removably engaging a neck of the animal in the holding condition to restrict animal movement through the gate opening, said head gate frame presenting upper and lower frame ends, with the gate panels extending vertically between the upper and lower frame ends, said head gate frame configured to be pivotally attached to the chute frame at a pivot joint adjacent one of the upper and lower frame ends, said pivot joint defining a lateral pivot axis of the head gate, with the head gate being swingable away from the chute frame toward the holding condition to orient the neck along a longitudinal direction and restrict movement of a head of the animal.

13. The livestock head gate assembly as claimed in claim 12, each of said gate panels being shiftably supported by the head gate frame to move between inboard and outboard positions.

14. The livestock head gate assembly as claimed in claim 13, each of said gate panels being slidably mounted on the head gate frame to slide along a panel slide axis between the inboard and outboard positions, with the panel slide axes being parallel to one another.

15. The livestock head gate assembly as claimed in claim 14, said pivot joint being located adjacent the lower frame end of the head gate frame.

16. The livestock head gate assembly as claimed in claim 12, said chute frame including a forward end that defines an egress opening through which the animal advances out of the alleyway, said head gate being attached relative to the forward end and shiftable between a retracted position, in which the head gate is located adjacent the discharge end, and the extended position, in which at least part of the head gate is shifted forwardly relative to the retracted position.

17. The livestock head gate assembly as claimed in claim 16, each of said gate panels being shiftably supported by the head gate frame to move between inboard and outboard positions associated, respectively, with the open and holding conditions, said gate panels being shiftable between the inboard and outboard positions while the head gate is located in either one of the retracted position and the extended position.

18. The livestock head gate assembly as claimed in claim 16, said pivot joint being located adjacent the lower frame end of the head gate frame, with the upper frame end being located adjacent the discharge end in the retracted position and shifted forwardly relative to the retracted position when the head gate is in the extended position.

19. The livestock head gate assembly as claimed in claim 16, said pivot joint being located adjacent the upper frame end of the head gate frame, with the lower frame end being located adjacent the discharge end in the retracted position and shifted forwardly relative to the retracted position when the head gate is in the extended position.

20. The livestock head gate assembly as claimed in claim 16, further comprising, a drive mechanism operably coupled to the head gate frame and configured to be coupled to the chute frame to shift the head gate relative to the chute frame between the retracted position and the extended position.

21. The livestock head gate assembly as claimed in claim 20, said drive mechanism including a powered motor attached between the head gate frame and chute frame.

22. The livestock head gate assembly as claimed in claim 21, said pivot joint being located adjacent the lower frame end of the head gate frame.

23. A head gate mounting kit configured to shiftably interconnect an elongated livestock chute frame and an upright head gate, said chute frame at least partly defining an alleyway that extends longitudinally to receive an animal, with the chute frame permitting the animal to advance forwardly through the alleyway, said head gate including a head gate frame and a pair of laterally spaced gate panels configured to removably engage the neck of the animal, said head gate mounting kit comprising:

hinged pivot elements that cooperatively form a pivot joint, with a first one of the pivot elements configured to be attached to the chute frame and a second one of the pivot elements configured to be attached to the head gate frame, said pivot joint configured to define a lateral pivot axis of the head gate and permitting the head gate to swing between a retracted position and an extended position, in which at least part of the head gate is shifted forwardly relative to the retracted position to orient the neck along a longitudinal direction and restrict movement of a head of the animal; and a drive mechanism configured to be coupled to the head gate frame and the chute frame to swing the head gate relative to the chute frame between the retracted position and the extended position.

24. The head gate mounting kit as claimed in claim 23, said pivot joint configured to be located adjacent a lower frame end of the head gate frame.

25. The head gate mounting kit as claimed in claim 23, said drive mechanism including a powered motor attached between the head gate frame and chute frame.

* * * * *